March 31, 1959   M. GOLDMAN ET AL   2,879,744
SPONGE ACTIVATED WATER FILLED INK CARTRIDGE PEN
Filed Jan. 22, 1958   3 Sheets-Sheet 1
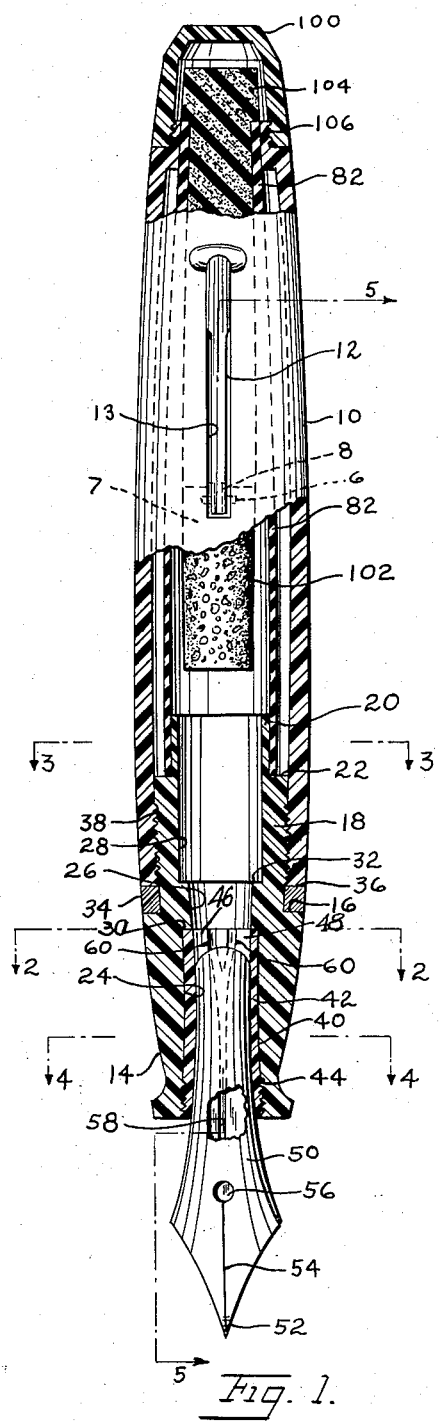
Fig. 1.
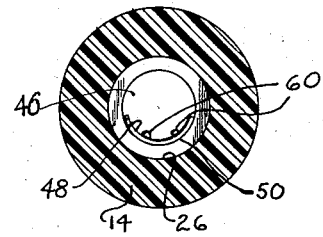
Fig. 2.
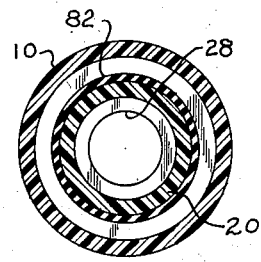
Fig. 3.
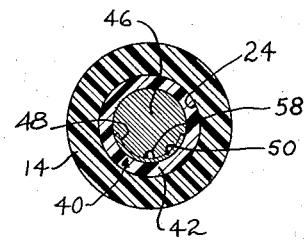
Fig. 4.
INVENTORS
MAX GOLDMAN
ALEX GOLDMAN
BY
ATTORNEY

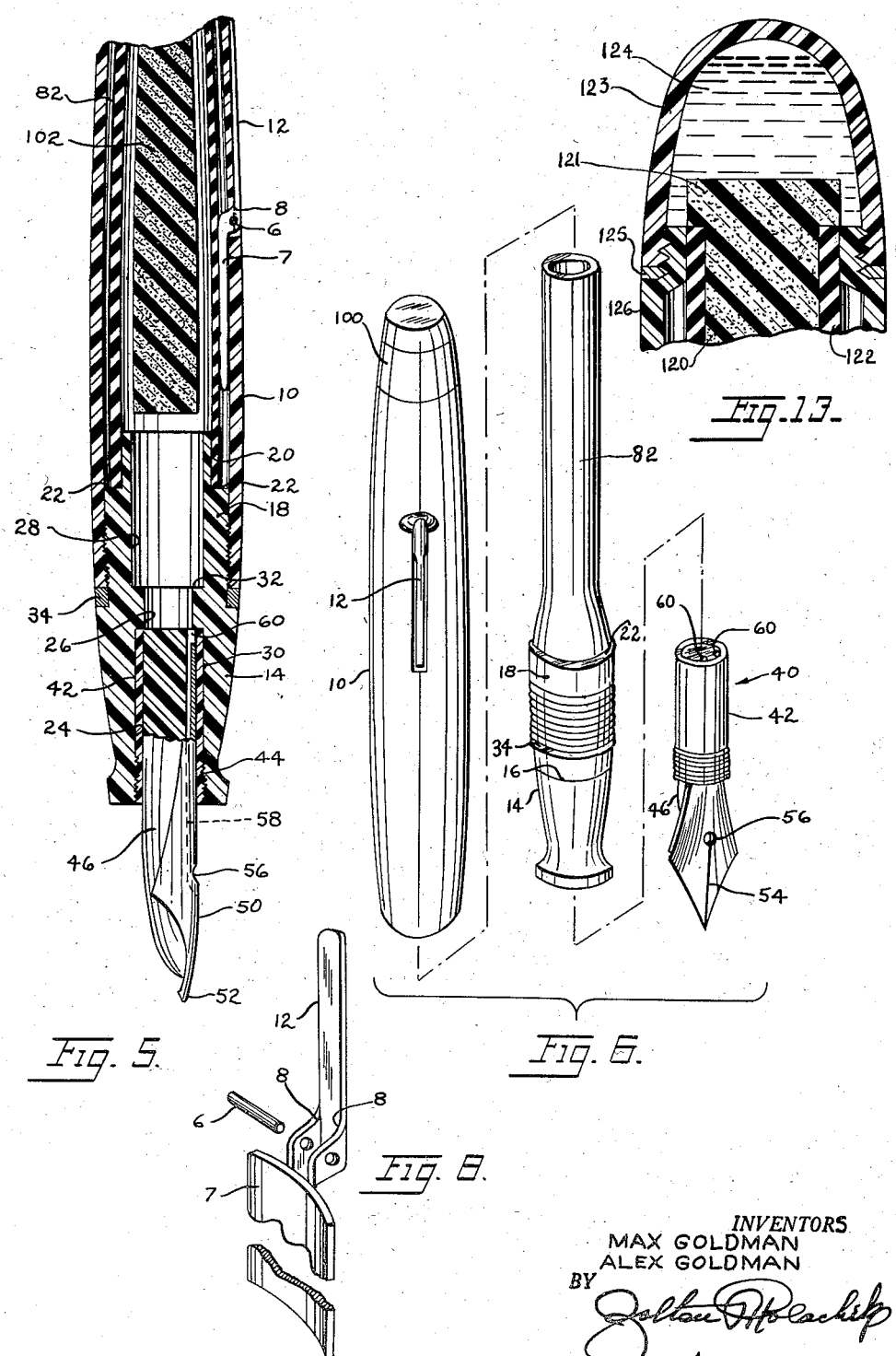

March 31, 1959     M. GOLDMAN ET AL     2,879,744
SPONGE ACTIVATED WATER FILLED INK CARTRIDGE PEN
Filed Jan. 22, 1958     3 Sheets-Sheet 3

INVENTORS
MAX GOLDMAN
ALEX GOLDMAN
BY
ATTORNEY

United States Patent Office 2,879,744
Patented Mar. 31, 1959

2,879,744

SPONGE ACTIVATED WATER FILLED INK CARTRIDGE PEN

Max Goldman and Alex Goldman, Forest Hills, N.Y.

Application January 22, 1958, Serial No. 710,497

7 Claims. (Cl. 120—42.15)

This invention relates generally to fountain pens, and more particularly has reference to a fountain pen that is designed to permit the same to be filled with water, with the pen including a sponge-like cartridge therein which is adapted to hold a substantial quantity of solidified particles of pigment of a selected color, in an arrangement such that on absorption of the water by the sponge, and on the subsequent squeezing of the water from the sponge, particles will dissolve within the sponge and be caused to be effused therefrom with the water, thereby to produce ink within the pen.

One object of importance is to provide a fountain pen that will be capable of efficient use at far less cost than has heretofore been required, by reason of the adaptability of the pen for using ordinary water as the filling liquid, rather than previously prepared liquid ink.

Another object is to provide a fountain pen that will be capable of manufacture at little or no increase in cost above that required for the manufacture of pens not having the desirable characteristics of the invention.

Still another object is to incorporate in the pen a means whereby the sponge-like cartridge may be readily squeezed to cause the ink to be effused therefrom within the barrel of the pen, with the squeezing operation at the same time creating a partial vacuum within the reservoir or sac of the barrel, to cause a fresh supply of water to be sucked into the barrel.

A further object is to so mount the sponge-like element in the sac as to cause said element to be exposed to impingement of the water thereagainst over a substantial portion of the length of the sac and barrel of the pen.

Yet another object is to provide, in one form of the invention, an arrangement wherein operation of the filler lever conventionally provided upon a fountain pen serves not only to exhaust air from the resilient, collapsible sac for drawing in liquid, but also serves to squeeze the sponge-like element so as to agitate water therein and improve the dissolution of the particles of ink pigment confined within the sponge element.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a view of a fountain pen according to the present invention, partly in front elevation and partly in longitudinal section.

Fig. 2 is an enlarged transverse section substantially on line 2—2 of Fig. 1.

Fig. 3 is a transverse section on the same scale as Fig. 2, substantially on line 3—3 of Fig. 1.

Fig. 4 is a transverse section on the same scale as Fig. 2, substantially on line 4—4 of Fig. 1.

Fig. 5 is a fragmentary, longitudinal sectional view, substantially on line 5—5 of Fig. 1.

Fig. 6 is an enlarged, exploded perspective view of the fountain pen.

Fig. 8 is an enlarged, exploded perspective view of the lever per se.

Fig. 13 is a view similar to Fig. 11 of another modification.

Figure 7:
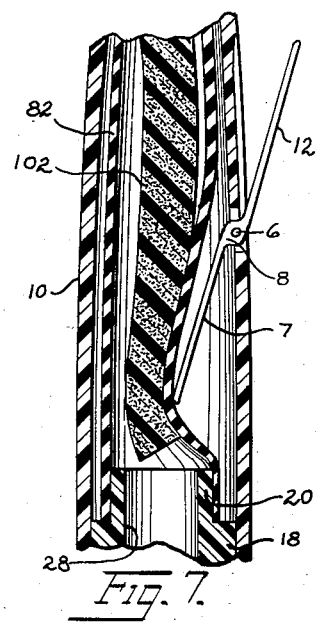
Fig. 7 is a longitudinal sectional view on the same cutting plane as Fig. 5, with the lever in filling position.

An elongated, plastic barrel 10 is provided, intermediate its ends, with the usual filling lever 12, which is pivotally mounted in a suitable, shallow longitudinal recess 13 of the barrel. The filling lever, as will be understood, is so pivoted upon the barrel as to cause the same to exert pressure against an elongated sac of soft rubber or similar, non-porous resilient material, in a manner to expel air from the sac, cause a partial vacuum therein, and thereby create a suction which will tend to draw liquid into the sac when the lever is released and returns, under the usual spring bias provided therefor, to the normal position shown in Fig. 1.

It will be understood that the barrel will be so designed as to receive the usual, elongated cap, not shown, which cap is engageable with either end of the barrel, according to whether the fountain pen is or is not being used.

A support sleeve 14, of molded plastic or similar material, is formed intermediate its ends with an external shoulder 16, provided at the base of an elongated axial extension 18 which in turn merges into a reduced axial projection 20, at the base of which there is an external shoulder 22. The sleeve 14 is thus stepped in diameter, for a purpose to be made presently apparent.

Sleeve 14 is formed with an end-to-end axial bore 24, having intermediate the ends of the sleeve a constricted or reduced portion 26 merging into a counterbore 28. This defines, at opposite ends of the constricted portion 26, oppositely facing, internal shoulders 30, 32 respectively (see Fig. 1).

Designated at 34 is a ring which may be of ornamentally surfaced metal or the like, press-fitted on the sleeve, and bearing against shoulder 16. Abutting against the sleeve is the open end 36 of barrel 10, the barrel having internal threads adjacent the end 36, engageable with external threads 38 formed upon axial extension 18 of sleeve 14. Of course, any other means for connecting the barrel to the sleeve can be provided, as for example, a press-fit, cement, etc.

Designated generally at 40 is a nib assembly that includes, in a preferred embodiment, a transparent, cylindrical, plastic ferrule 42 having at its outer end threads 44 engaging internal threads formed in the outer end of sleeve 14. When threadedly engaged in the sleeve, the ferrule bears at its inner end against the shoulder 30 (see Figs. 1 and 5), with the inner diameter of the ferrule being equal to the diameter of the constricted portion 26 of bore 24.

Cemented in the ferrule 42 is an elongated feed bar 46, having a shallow longitudinal groove or recess 48 (see Fig. 4) for the greatest part of its length in which snugly engages a transversely curved, elongated nib 50 having the usual point 52, longitudinal slit 54, and air and fluid inlet 56, said slit communicating between the inlet 56 and the point 52.

Also formed in the feed bar, in communication with the recess 48, is a longitudinal passage 58 extending (see Fig. 5) from the inlet 56 to the inner end of the feed bar. At the inner end of the feed bar, the passage 58 is provided with forks 60 (see Figs. 1 and 2).

Designated at 82 is a reservoir for the liquid that is to be drawn into the pen. In accordance with the invention, clear water is drawn into the reservoir or filler sac 82 of the pen. At its lower end, the sac is formed open and is distended to sealably engage about the projection 20, in a position bearing against the shoulder 22. Cement may be applied where the sac is connected to the extension or projection 20, to prevent leakage of liquid from the reservoir 82.

At its upper end, the sac is formed open, and is cemented to the inner surface of the upper extremity of the barrel.

The filler lever, designated at 12, includes within the barrel a wide inner portion 7, transversely curved correspondingly to the curvature of the adjacent portion of the wall of the barrel. At its upper end, the portion 7 is integral with ears 8 having transversely aligned openings receiving a hinge pin 6, the ends of which are engaged in pin-receiving recesses of the barrel. The lever is thus rockably mounted upon the pin, for movement between its normal, Fig. 5 position and its filling position shown in Fig. 7. In the latter position, the lever bears against the sac, to exhaust air therefrom, thereby creating a partial vacuum which, on return of the lever to its normal position, will cause water to be sucked into the sac through the passage 58 of the feed bar 46.

An elongated, resiliently compressible, absorbent cartridge 102 has at its upper end an enlarged head 104. The cartridge may be formed of a sponge material or the like, and is completely infused with solidified ink pigments. Thus, in manufacture of the cartridge, it may be completely saturated with a highly concentrated ink solution, after which said solution is permitted to dry within the cartridge, to solidify the pigments thereof. This would make the cartridge relatively stiff when dry, so that it can be inserted through the open upper end of the sac, following removal of an end cap 100. End cap 100 has internal threads engageable with external threads of a reduced, axial extension 106 of the barrel, in which extension the upper end of the sac is cemented.

Thus, the body of the cartridge is inserted through the upper end of the sac, with the head seating firmly against the registering top surfaces of the sac 82 and extension 106. Then, the cap 100 is threaded into place, sealing the upper end of the reservoir.

In use of the pen, the filler lever is operated and when shifted to its Fig. 7 position will not only squeeze the filler sac, but will also squeeze the body portion of the cartridge. The cartridge will thus be compressed, causing an inky effusion to issue therefrom into the reservoir for mixture with the water. Each time the pen is filled, the cartridge is squeezed, and of course, all during normal use of the pen the water will be continuously circulating through the cartridge to insure to the maximum extent the dissolution of the particles. On exhaustion of the pigment, the cartridge is removed and is replaced by a new one.

Figure 10:
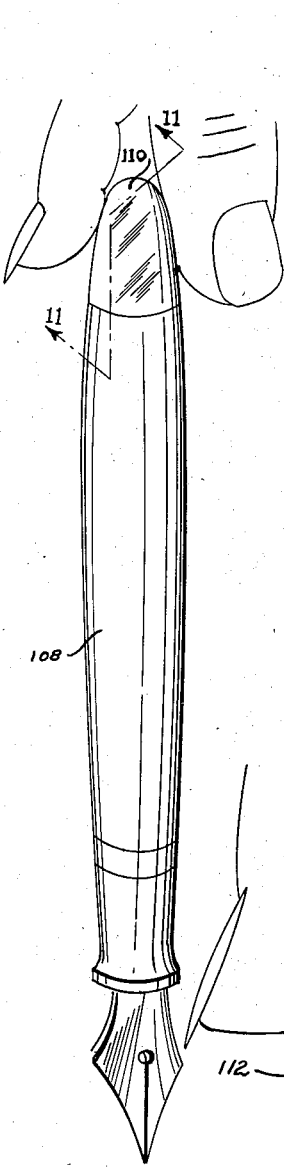
Fig. 10 is a perspective view of a modification including a deformable end cap.
Figure 11:
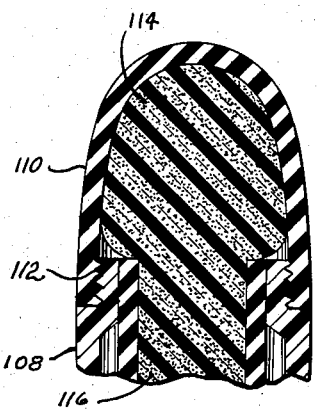
Fig. 11 is an enlarged, longitudinal sectional view on line 11—11 of Fig. 10.
Figures 9, 12:
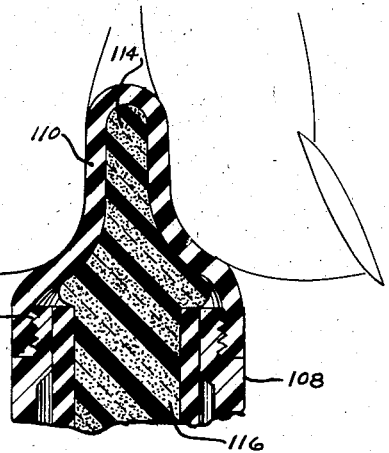
Fig. 9 is an exploded, fragmentary perspective view showing the upper portion of the pen.
Fig. 12 is a view on the same cutting plane as Fig. 11, showing the cap squeezed during the filling of the pen.

In Figs. 10–12 there is shown a modified construction, which is similar to the first form in all respects, with the exception that there is no filler lever. The filling of the pen is accomplished in this instance through the provision of a deformable, plastic, end cap 110, threadedly attached to the upper end of a barrel. The barrel 108, and the feed bar, nib, etc., are identical in all respects to the corresponding portions of the first form of the invention, with the exception that the filler lever is omitted.

In this form, the end cap 110 may be made transparent, so that one may visually observe the interior of the upper end of the reservoir. Polyethylene, such as is widely used in so-called "squeeze bottles" of deodorant, hair spray, etc., can be employed for this purpose. In any event, in this form the cartridge has an enlarged head 114 merging into an elongated body portion 116, similar generally to the cartridge of the first form of the invention. The head substantially completely fills the cap 110.

Therefore, assuming that it is desired to refill the pen with water, one squeezes the cap in the manner shown in Fig. 12, and this exhausts air from the barrel. At the same time, the cartridge itself is squeezed, so that any water therein is forced out of the same, in a manner to create the inky effusion mentioned, and insure that the incoming water will immediately flow into the cartridge.

When the cap is released, it returns to its normal position, and as a result, water is sucked into the sac.

In the modification of the invention shown in Fig. 13, the cartridge 120 is similar to the cartridge of the first form of the invention but is provided with a smaller head 121 which seats on the top of the sac 122, leaving a space therearound. In this form, the end cap 123, which may be made of compressible plastic material, serves as a reservoir for ink 124. A gasket 125 is interposed between the bottom end of the cap and the top of the barrel 126 to seal the ink in the pen.

In all other respects, the form of invention shown in Fig. 13 is similar to the form shown in Figs. 10–12, the sac 122 holding the water and the cap 123 and cartridge 120 holding the concentrated ink. After each filling of the sac with water, the cartridge will draw and hold a sufficient amount of the concentrate to be ready for the next filling.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. In a fountain pen, a barrel, a nib assembly connected thereto and having a passage, a filler sac extending within the barrel and communicating at one end with the passage of the nib assembly, and a resiliently compressible, liquid-absorbent cartridge mounted within said sac and containing a quantity of solid pigments soluble in water to form ink, said barrel being formed open at the end thereof remote from the nib assembly, said fountain pen including a cap closing the open end of the barrel, the cartridge being insertable in and removable from the barrel through said end of the barrel, said sac being formed open at the end thereof corresponding to said end of the barrel, whereby said cartridge may be inserted in and removed from the sac through said open end thereof, said cartridge being formed with an enlarged head disposed within the cap, and including an elongated body extending within the sac for a substantial portion of the length thereof.

2. In a fountain pen, a barrel, a nib assembly connected thereto and having a passage, a filler sac extending within the barrel and communicating at one end with the passage of the nib assembly, and a resiliently compressible, liquid-absorbent cartridge mounted within said sac and containing a quantity of solid pigments soluble in water to form ink, said barrel being formed open at the end thereof remote from the nib assembly, said fountain pen including a cap closing the open end of the barrel, the cartridge being insertable in and removable from the barrel through said end of the barrel, said sac being formed open at the end thereof corresponding to said end of the barrel, whereby said cartridge may be inserted in and removed from the sac through said open end thereof, said cap being formed of a deformable material, whereby on squeezing of the cap air will be exhausted from the sac to be replaced by liquid on return of the cap to its normal condition.

3. In a fountain pen, a barrel, a nib assembly connected thereto and having a passage, a filler sac extending within the barrel and communicating at one end with the passage of the nib assembly, and a resiliently compressible, liquid-absorbent cartridge mounted within said sac, said barrel being formed open at the end thereof remote from the nib assembly, said fountain pen including a cap closing the open end of the barrel, the cartridge being insertable in and removable from the barrel through said end of the barrel, said sac being formed open at the end thereof corresponding to said end of the barrel, whereby said cartridge may be inserted in and removed from the sac through said open end thereof, said cap being formed of a deformable material, whereby on squeezing of the cap air will be exhausted from the sac to be replaced by liquid on return of the cap to its normal condition, said cap being removable and constituting a reservoir for a concentrated ink supply.

4. A fountain pen as defined in claim 3 characterized by a gasket interposed between the end of the cap and the end of the barrel for preventing leakage of the ink from the cap.

5. A fountain pen as defined in claim 1, characterized by a filler lever mounted upon the barrel and rockable to a position in which said filler lever exerts a squeezing pressure both upon the sac and the cartridge body.

6. A fountain pen as defined in claim 2, wherein the head of the cartridge substantially completely fills the cap.

7. A fountain pen as defined in claim 6, wherein the barrel is formed with a reduced, threaded extension at said end thereof remote from the nib assembly, said cap being internally threaded for engagement with said extension.

References Cited in the file of this patent

UNITED STATES PATENTS

| | | |
|---|---|---|
| 1,164,157 | Zollinger | Dec. 14, 1915 |
| 2,030,452 | Kingman | Feb. 11, 1936 |

FOREIGN PATENTS

| | | |
|---|---|---|
| 17,118 | Great Britain | Aug. 9, 1898 |